(12) United States Patent
Winn et al.

(10) Patent No.: US 10,063,594 B2
(45) Date of Patent: *Aug. 28, 2018

(54) NETWORK ACCESS CONTROL WITH COMPLIANCE POLICY CHECK

(71) Applicant: OPSWAT, Inc., San Francisco, CA (US)

(72) Inventors: Adam Gregory Winn, Berkeley, CA (US); Benjamin Czarny, San Francisco, CA (US); Jianpeng Mo, Burlingame, CA (US); Yiyi Miao, San Mateo, CA (US)

(73) Assignee: OPSWAT, INC., San Francisco, CA (US)

(*) Notice: Subject to any disclaimer, the term of this patent is extended or adjusted under 35 U.S.C. 154(b) by 221 days.

This patent is subject to a terminal disclaimer.

(21) Appl. No.: 15/069,459

(22) Filed: Mar. 14, 2016

(65) Prior Publication Data

US 2016/0197962 A1 Jul. 7, 2016

Related U.S. Application Data

(63) Continuation-in-part of application No. 14/572,699, filed on Dec. 16, 2014, now Pat. No. 9,288,199.

(51) Int. Cl.
*H04L 29/06* (2006.01)

(52) U.S. Cl.
CPC .......... *H04L 63/20* (2013.01); *H04L 63/0823* (2013.01); *H04L 63/10* (2013.01); *H04L 63/0428* (2013.01); *H04L 63/1416* (2013.01)

(58) Field of Classification Search
CPC ...... H04L 63/20; H04L 63/0823; H04L 63/10
See application file for complete search history.

(56) References Cited

U.S. PATENT DOCUMENTS

| 8,418,238 B2* | 4/2013 | Platt | H04L 63/0815 |
| | | | 726/1 |
| 9,058,495 B2* | 6/2015 | Brannon | G06F 21/60 |

(Continued)

OTHER PUBLICATIONS

Notice of Allowance dated Feb. 1, 2016 for U.S. Appl. No. 14/572,699.

(Continued)

*Primary Examiner* — Farid Homayounmehr
*Assistant Examiner* — Thanh T Le
(74) *Attorney, Agent, or Firm* — The Mueller Law Offie, P.C.

(57) ABSTRACT

Embodiments of the present invention include methods involving an authentication application, a client application, or a combination of a network access control server with the authentication application and the client application. The client application collects compliance data regarding the user device and communicates the compliance data to the network access control server. The network access control server generates a compliance check result based on whether the compliance data indicates that the user device is compliant with a security policy for the software-as-a-service server. The authentication application grants access by the user device when the compliance check result is positive; and the authentication application denies access by the user device when the compliance check result is negative. In some embodiments, the compliance check result or a user device identifier is stored in a web browser cookie or a client certificate on the user device.

17 Claims, 5 Drawing Sheets

(56) References Cited

U.S. PATENT DOCUMENTS

| | | | |
|---|---|---|---|
| 9,288,199 B1 | 3/2016 | Winn et al. | |
| 9,361,451 B2* | 6/2016 | Oberheide | G06F 21/45 |
| 9,524,388 B2* | 12/2016 | Oberheide | G06F 21/34 |
| 9,646,309 B2* | 5/2017 | Goldschlag | G06Q 30/018 |
| 9,686,287 B2* | 6/2017 | Manton | H04L 63/10 |
| 9,825,996 B2* | 11/2017 | Brannon | H04L 63/205 |
| 2004/0167984 A1* | 8/2004 | Herrmann | H04L 63/08 709/229 |
| 2005/0278775 A1* | 12/2005 | Ross | G06Q 20/382 726/2 |
| 2006/0005254 A1* | 1/2006 | Ross | H04L 63/0263 726/27 |
| 2006/0059549 A1* | 3/2006 | Suzuki | H04L 29/12254 726/9 |
| 2008/0298588 A1* | 12/2008 | Shakkarwar | G06Q 20/02 380/255 |
| 2009/0271870 A1* | 10/2009 | Vepsalainen | G06F 21/33 726/27 |
| 2009/0300707 A1* | 12/2009 | Garimella | H04L 63/0823 726/1 |
| 2010/0306547 A1* | 12/2010 | Fallows | G06F 21/305 713/178 |
| 2011/0277026 A1 | 11/2011 | Agarwal et al. | |
| 2012/0137352 A1* | 5/2012 | Smales | G06F 21/31 726/7 |
| 2012/0151568 A1 | 6/2012 | Pieczul et al. | |
| 2013/0091544 A1* | 4/2013 | Oberheide | G06F 21/34 726/1 |
| 2013/0152169 A1* | 6/2013 | Stuntebeck | H04L 67/16 726/4 |
| 2013/0185812 A1 | 7/2013 | Lie et al. | |
| 2013/0339514 A1 | 12/2013 | Crank et al. | |
| 2013/0339736 A1* | 12/2013 | Nayshtut | H04L 63/08 713/170 |
| 2014/0053238 A1* | 2/2014 | Brannon | H04L 63/0861 726/1 |
| 2014/0082715 A1* | 3/2014 | Grajek | G06F 17/30876 726/8 |
| 2014/0109194 A1* | 4/2014 | Manton | H04L 63/08 726/4 |
| 2014/0123236 A1* | 5/2014 | Hirata | H04L 63/0807 726/4 |
| 2014/0173705 A1* | 6/2014 | Manning | H04L 63/08 726/6 |
| 2014/0258711 A1* | 9/2014 | Brannon | H04L 63/0823 713/156 |
| 2014/0270410 A1* | 9/2014 | Stuntebeck | G07C 9/00087 382/118 |
| 2014/0282894 A1* | 9/2014 | Manton | H04L 63/102 726/4 |
| 2014/0331303 A1* | 11/2014 | Park | H04W 12/06 726/10 |
| 2015/0039890 A1* | 2/2015 | Khosravi | H04L 9/0841 713/171 |
| 2016/0044511 A1* | 2/2016 | Broch | H04W 12/06 726/4 |
| 2016/0196414 A1* | 7/2016 | Stuntebeck | G01P 13/00 726/17 |
| 2017/0157859 A1* | 6/2017 | Mahdavi | B29C 67/0088 |
| 2017/0163429 A1* | 6/2017 | Stuntebeck | H04L 9/3263 |
| 2017/0250807 A1* | 8/2017 | Brannon | H04L 9/0822 |
| 2017/0270292 A1* | 9/2017 | Harrison | H04L 67/16 |

OTHER PUBLICATIONS

Office Action dated Aug. 26, 2015 for U.S. Appl. No. 14/572,699.
Office Action dated Mar. 29, 2015 for U.S. Appl. No. 14/572,699.

* cited by examiner

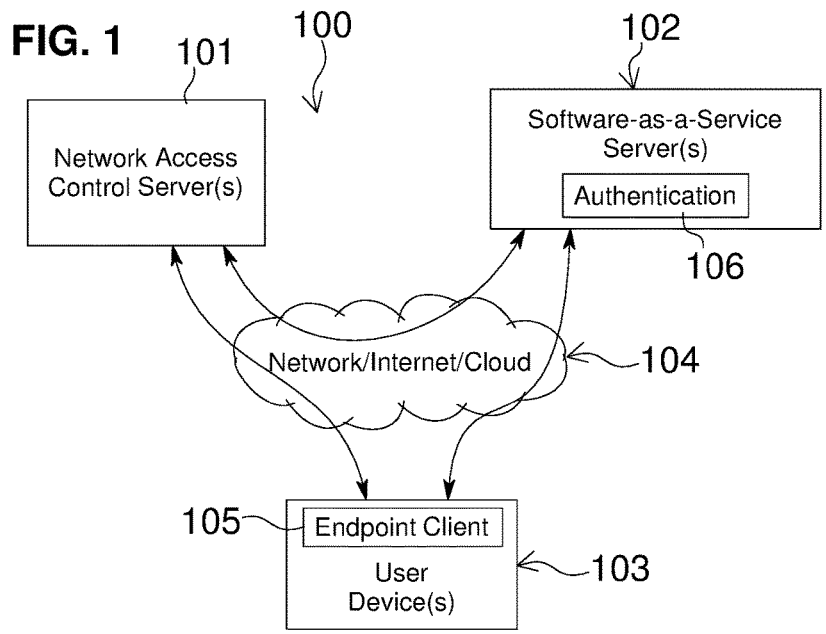
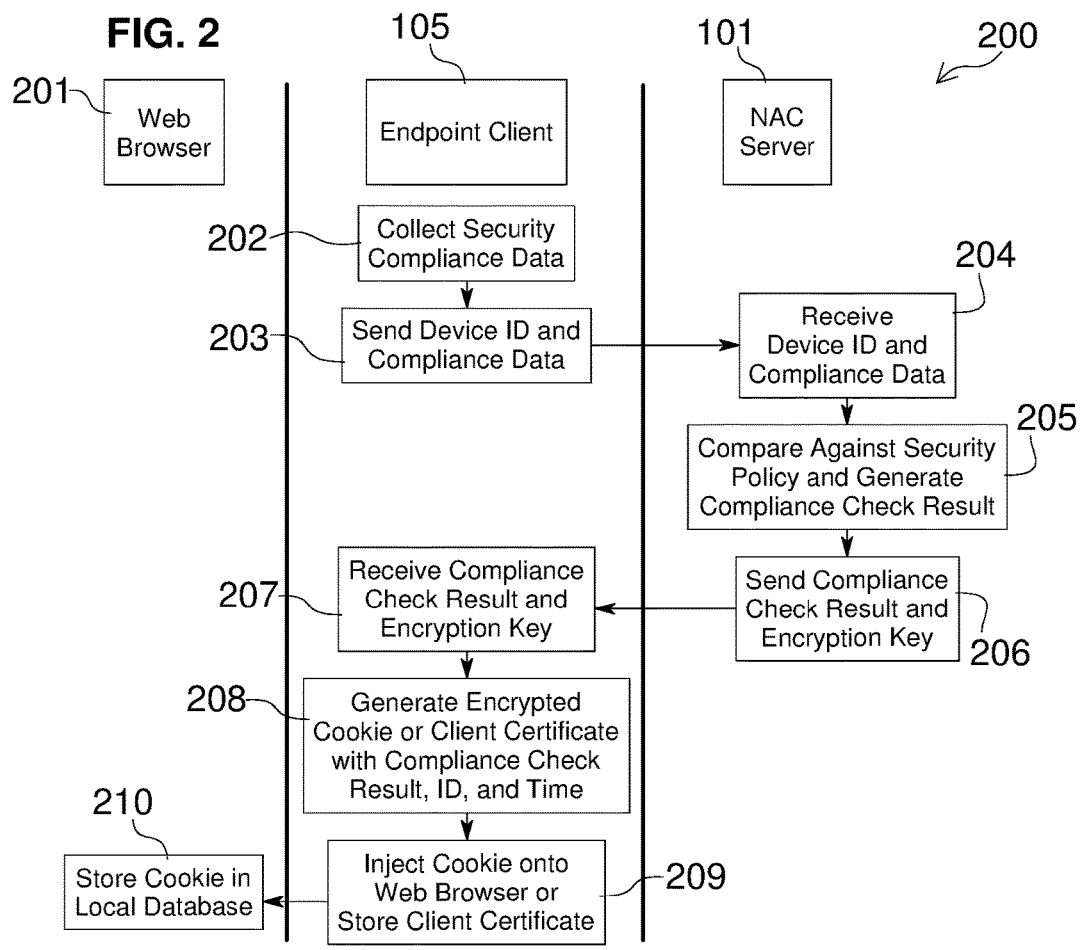

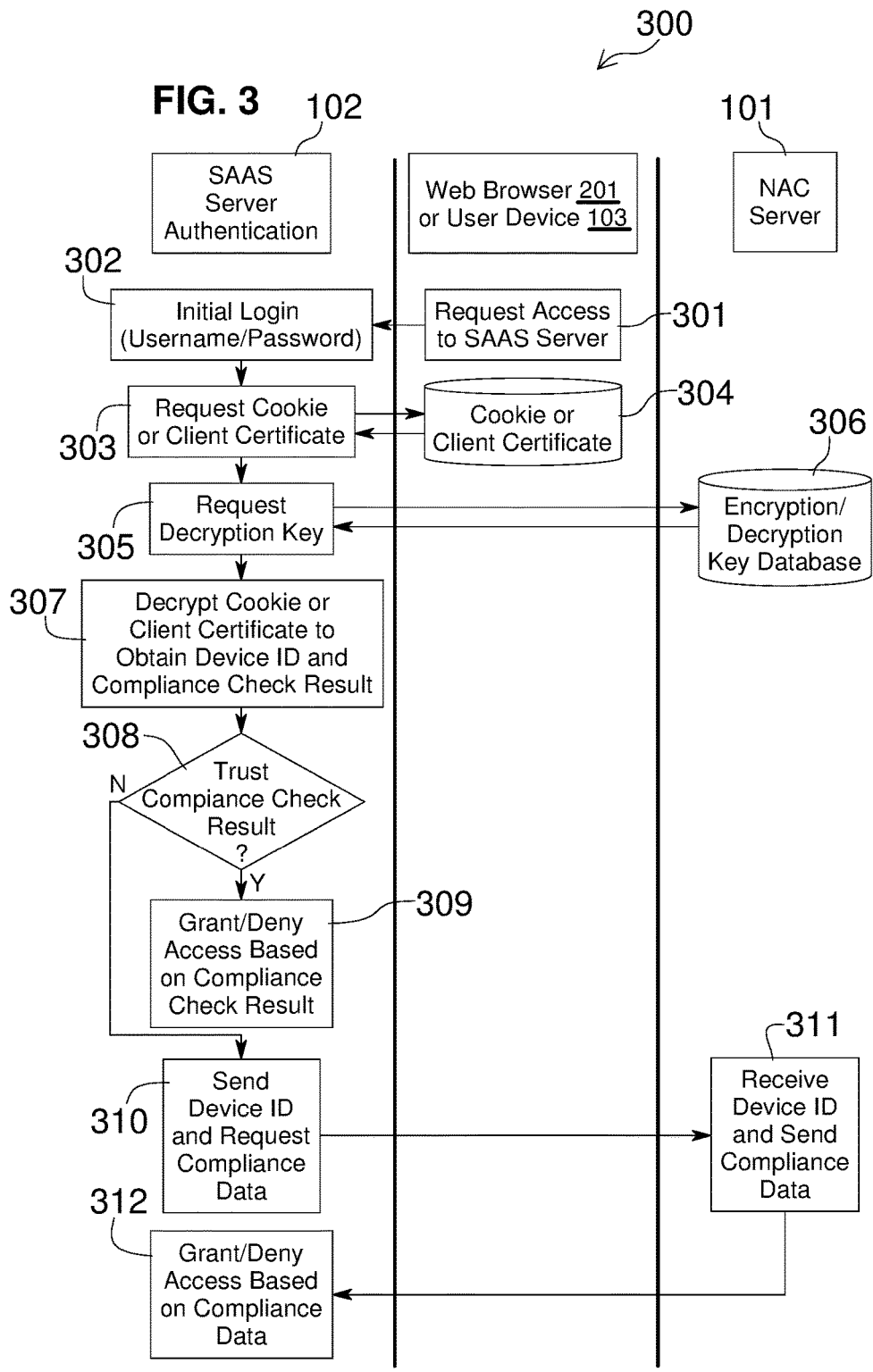

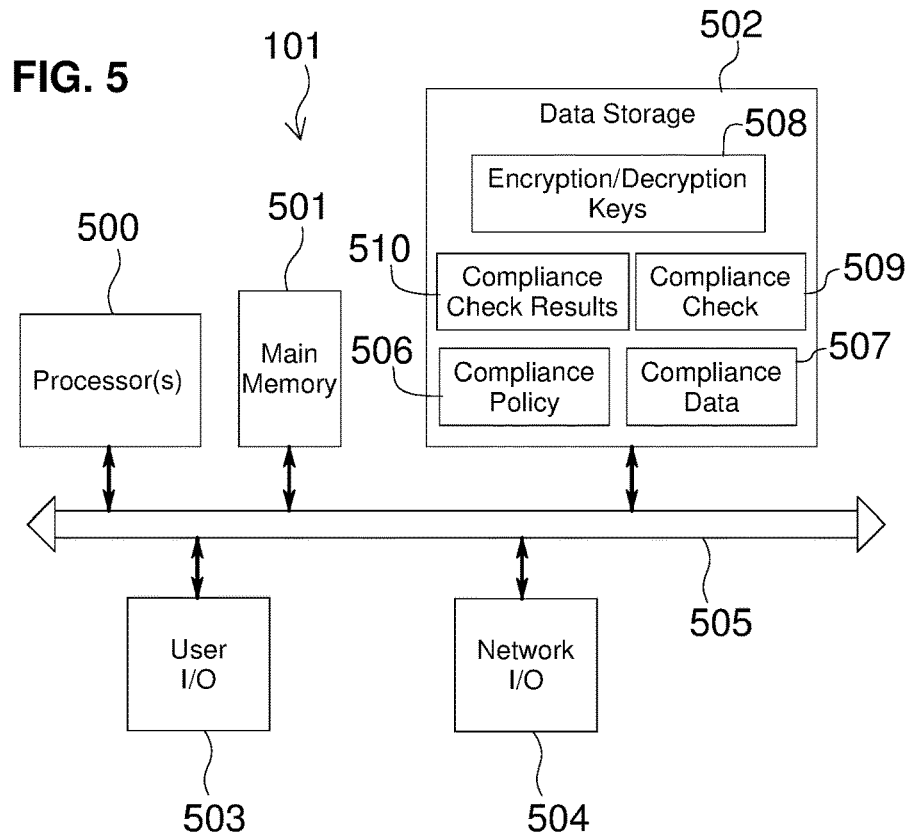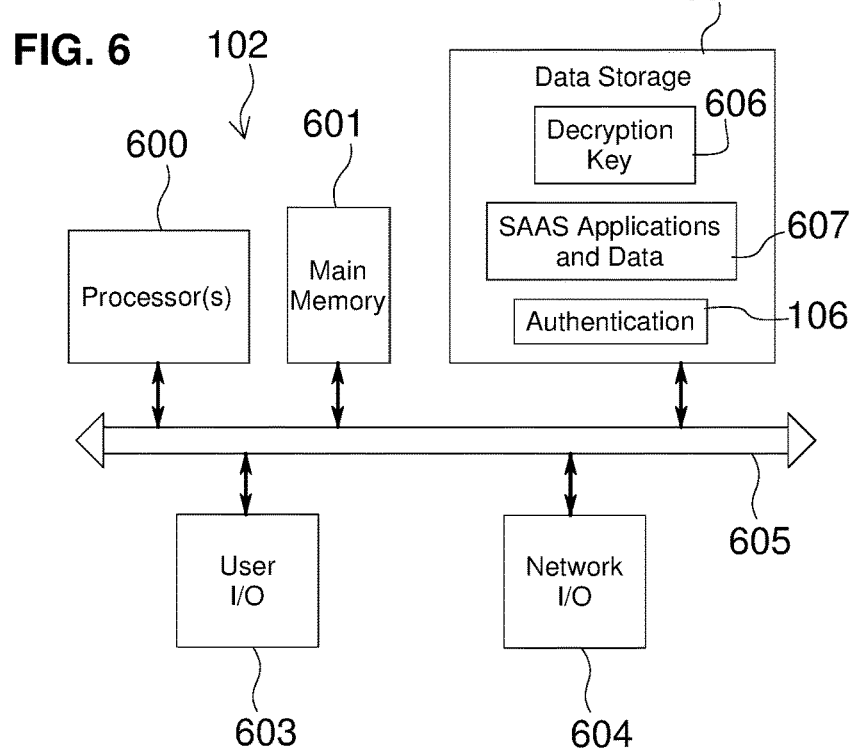

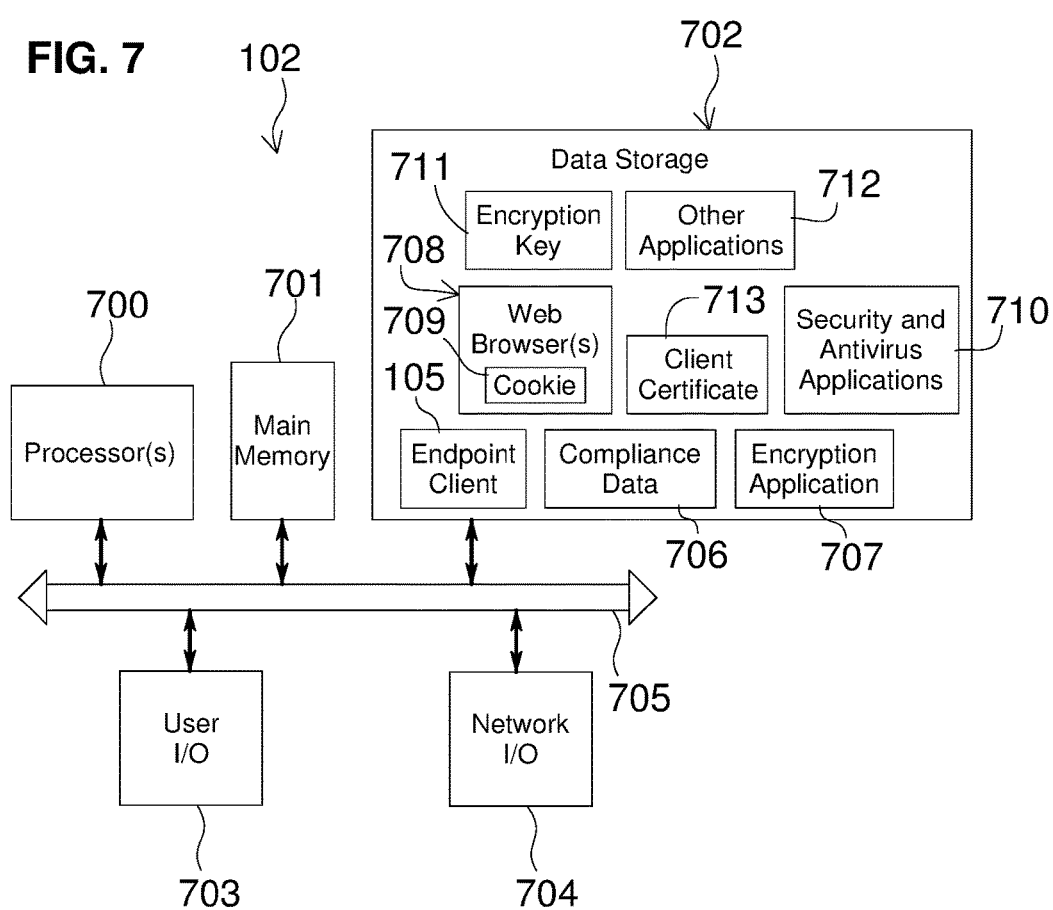

NETWORK ACCESS CONTROL WITH COMPLIANCE POLICY CHECK

CROSS REFERENCE TO RELATED APPLICATIONS

This patent application is a continuation-in-part of U.S. patent application Ser. No. 14/572,699 filed Dec. 16, 2014, which is incorporated by reference herein.

BACKGROUND OF THE INVENTION

Network access control (NAC), also called network admission control, enhances or enables the security of a proprietary network (e.g., a Software-as-a-Service (SAAS) proprietary network server) by restricting the availability of network resources to endpoint user devices that comply with a defined security policy. In some cases, an NAC server performs authentication and authorization functions for the user devices of potential subscribers by verifying login information, e.g. username and password, when the user devices attempt to login to the proprietary network, e.g., through the Internet. In addition, the NAC server may restrict the data that each particular user or user device can access and may implement anti-threat applications such as firewalls, antivirus software, and spyware-detection programs. The NAC server may also regulate and restrict the actions that individual subscribers can do within the proprietary network once they are logged in.

NAC is commonly used by corporations, agencies, and other entities that require the user environment to be rigidly controlled. However, security issues still arise with respect to NAC systems in proprietary networks with large numbers of users and many different, frequently changing, devices that may be used to access the proprietary network. An example is a proprietary network for a large university with multiple departments, numerous access points and thousands of users with various backgrounds and objectives.

SUMMARY OF THE INVENTION

Some embodiments of the present invention involve a method in which an authentication application receives a request from a user device to access a software-as-a-service server; retrieves a compliance check result generated by a network access control server based on 1) compliance data collected by a client application on the user device, and 2) a security policy for the software-as-a-service server; grants access by the user device to the software-as-a-service server when the compliance check result is positive; and denies access by the user device to the software-as-a-service server when the compliance check result is negative. In some embodiments, a web browser cookie or a client certificate is used to convey to the authentication application the compliance check result or a user device identifier.

Some embodiments of the present invention involve a method in which a client application on a user device collects compliance data on the user device; and sends the compliance data to a network access control server for the network access control server to generate a compliance check result based on the compliance data and a security policy for a software-as-a-service server, wherein the compliance check result is for use by an authentication application to grant access by the user device to the software-as-a-service server when the compliance check result is positive and to deny access by the user device to the software-as-a-service server when the compliance check result is negative. In some embodiments, a web browser cookie or a client certificate is used to convey to the authentication application the compliance check result or a user device identifier.

Some embodiments of the present invention involve a method and system including a network access control server, an authentication application running on a software-as-a-service server, and a device application running on a user device. The device application collects compliance data regarding the user device and communicates the compliance data to the network access control server. The network access control server generates and stores a compliance check result based on whether the compliance data indicates that the user device is compliant with a security policy for the software-as-a-service server. The client application stores a user device identifier in a client certificate on the user device. The authentication application requests the client certificate during a login procedure, reads the user device identifier, and requests the compliance check result from the network access control server. The authentication application grants access by the user device when the compliance check result is positive; and the authentication application denies access by the user device when the compliance check result is negative.

In some embodiments, the authentication application requests the compliance data from the network access control server. In this case, the authentication application may grant or deny access by the user device based on both the compliance check result and the compliance data.

In some embodiments, an authentication server generates a secure session ID when the user device attempts to login to the software-as-a-service server and the compliance check result is positive. In this case, the authentication application grants access by the user device based on the secure session ID.

In some embodiments, the compliance data includes hardware, software, and configuration data of the user device. For example, the compliance data may include an encryption state of the user device, a malware infection state of the user device, and/or whether an unwanted application is present on the user device.

BRIEF DESCRIPTION OF THE DRAWINGS

FIG. 1 is a simplified schematic diagram of an example network computerized system incorporating an embodiment of the present invention.

FIG. 2 is a simplified flowchart of a compliance check process for a user device used in the example network computerized system shown in FIG. 1 in accordance with an embodiment of the present invention.

FIG. 3 is a simplified flowchart of an authentication process for a user device within the example network computerized system shown in FIG. 1 in accordance with an embodiment of the present invention.

FIG. 5 is a simplified schematic diagram of a network access control (NAC) server for use in the example network computerized system shown in FIG. 1 in accordance with an embodiment of the present invention.

FIG. 6 is a simplified schematic diagram of an SAAS server for use in the example network computerized system shown in FIG. 1 in accordance with an embodiment of the present invention.

FIG. 7 is a simplified schematic diagram of a user device for use in the example network computerized system shown in FIG. 1 in accordance with an embodiment of the present invention.

DETAILED DESCRIPTION OF THE INVENTION

Figure 4:
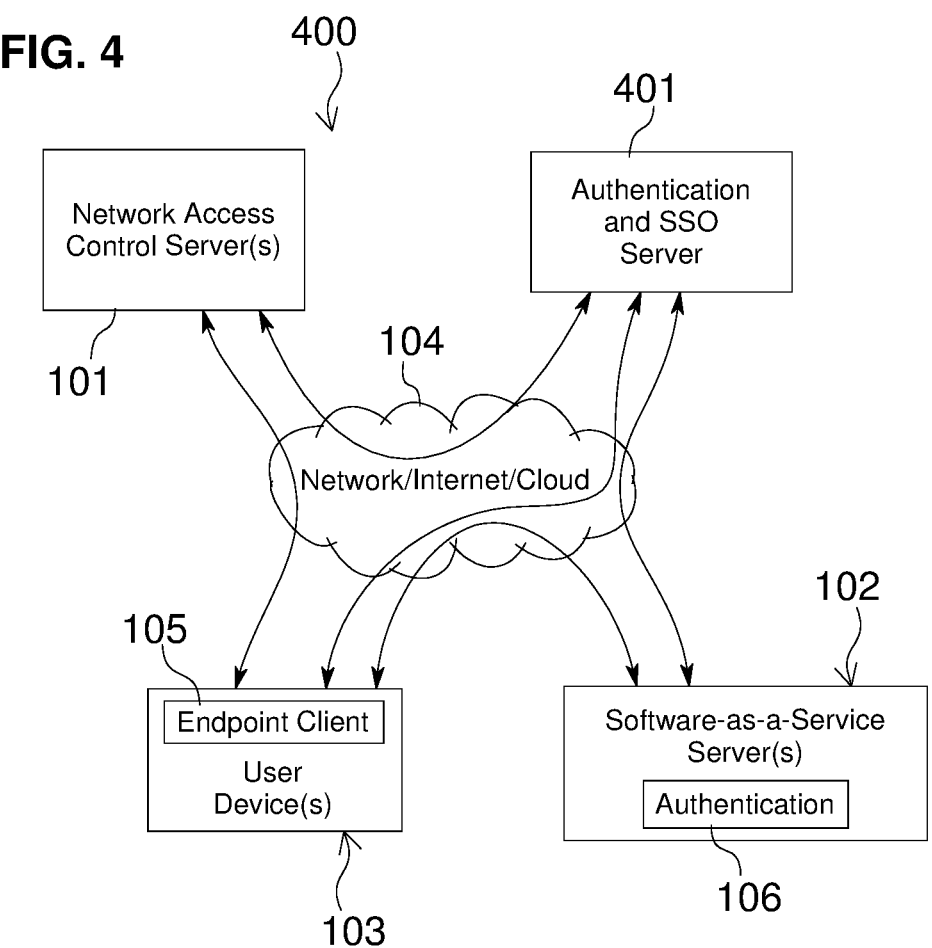
FIG. 4 is a simplified schematic diagram of another example network computerized system incorporating an embodiment of the present invention.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

An example network computerized system 100 incorporating an embodiment of the present invention is shown in FIG. 1. The network computerized system 100 generally includes one or more network access control (NAC) server 101, one or more Software-as-a-Service (SAAS) server 102, and one or more user device 103. The NAC server 101, the SAAS server 102, and the user device 103 generally communicate with each other via a network 104, such as the Internet, a cloud-based network, a wide area network (WAN), etc. The SAAS server 102 generally provides services to user devices (e.g. 103) that have been granted access after having been properly authenticated as being compliant with a compliance security policy that is customized for the requirements of the SAAS server 102. The compliance check and authentication procedures enable a relatively high level of security for the user devices 103 that access the SAAS server 102, without the SAAS server 102 having to place any additional information on the user devices 103 that would assist the SAAS server 102 in authenticating the user devices 103. This level of security may be in addition to a typical username/password login procedure for the user devices 103. Additionally, embodiments of the present invention may be used on almost any operating system or hardware platform and with almost any available web browser, e.g., Internet Explorer (IE), Firefox, Chrome, Safari, Opera, etc. Furthermore, in some embodiments, the compliance check procedure injects the results of the compliance check (and/or any other information needed for authenticating the user device 103) into a web browser cookie stored in some or all of the web browsers on the user device 103. Then the SAAS server 102 (or an authentication application) can request the cookie in order to perform the authentication procedure when the user device 103 attempts to access the SAAS server 102 through one of the web browsers.

Some other access control solutions typically include perimeter firewalls, intrusion detection and prevention, anti-malware, physical isolation, and maybe some additional baseline security mechanisms. However, these techniques require continuous monitoring of authentication, access, and activity on sensitive data, which is extremely difficult for maintenance. According to embodiments of the present invention, on the other hand, although there are various options for handling the decision to grant access, access control is generally directly handled by the SAAS server 102, or an authentication component thereof, without additional appliances or a proxy service. Embodiments of the present invention, therefore, generally enable authentication techniques that do not require such continuous monitoring. Thus, some additional components present in a conventional system may be eliminated, thereby decreasing or reducing maintenance requirements as well as opportunities to bypass security controls.

Additionally, some other access control solutions use a gateway server with a single sign on (SSO) feature enabled. The enterprise end users, therefore, access the SAAS server through the gateway server. However, these techniques may not be sufficiently secure to satisfy the security requirements of some SAAS vendors. Embodiments of the present invention, on the other hand, generally enable authentication techniques that are very robust and secure due to the compliance check described herein.

To perform the compliance check and enable the authentication capabilities herein, an endpoint client application 105 running on the user device 103 scans the user device 103 and collects data on the hardware, software, and configuration of the user device 103. The endpoint client application 105 may use low level drivers, a high level registry, and/or software inspection to collect some of this data. This data may be referred to as "health data," since much of the data generally relates to the fitness of the user device 103 for accessing the services of the SAAS server 102. Alternatively, this data may be referred to as "compliance data," since the data is generally used to determine whether the user device 103 is properly compliant with a security or compliance policy for accessing the services of the SAAS server 102. The compliance data and an identity data (or user device identifier generated by the user device 103 or the NAC server 101) for the user device 103 are sent to the NAC server 101.

The NAC server 101 may manage the security policies for the SAAS servers 102, host a device information database, and receive the compliance data from the user devices 103. The NAC server 101 generally uses the compliance data and the identity data to generate a "compliance check result" that indicates whether the user device 103 is compliant with the security policy for the SAAS server 102. Then when the user device 103 attempts to access or login to the SAAS server 102, an authentication application 106 running on the SAAS server 102 manages the user authentication process by using the compliance check result (among other appropriate information) to determine whether to grant or deny access. If the user device 103 is supposed to be able to access more than one of the SAAS server 102, each potentially having different security policies, then the NAC server 101 generates a compliance check result for each such SAAS server 102.

The compliance data collected by the user device 103 generally includes information related to an encryption state of data stored on the user device 103, the potential for a malware infection in the user device 103, the presence of potentially unwanted or undesirable applications on the user device 103, and/or unwanted hardware, among other potential types of data. The types of data generally relate to the potential for a breach of security or a corruption, loss or theft of the data that the user device 103 may receive from the SAAS server 102 or malicious files that the user device 103 may send to the SAAS server 102.

The compliance check result may indicate whether the user device 103 passes or fails compliance with the security policy on one or more grounds. In a simple form, the compliance check result is a mere pass/fail flag, causing the authentication application 106 to either grant or deny access to the SAAS server 102 for the user device 103. In more complex or more detailed forms, the compliance check result may include additional information or compliance details, e.g., the specific grounds for failure, a pass/fail flag for each individual component of the compliance data, the running state of some applications, anti-malware definition state information, etc. In this manner, the authentication application 106 can provide more than a simple grant or deny response to an attempt by the user device 103 to login to the SAAS server 102. For example, the authentication application 106 may provide different levels of access to the SAAS server 102 for the user devices 103, or may provide different alerts or reports to an administrator regarding attempts to access the SAAS server 102, based on the information in the compliance check result.

In some embodiments, the authentication application 106 uses the identity data for the user device 103 to query the NAC server 101 to obtain the compliance data and make an access grant/deny decision according to the actual device status, e.g., by performing the compliance check by the authentication application 106, instead of by the NAC server 101. In this case, the compliance security policy is defined and managed on the SAAS server 102, while the device inspection and identification is still performed by the endpoint client application 105.

In some embodiments, the endpoint client application 105 has access to "settings" information for the user device 103. With this capability, the endpoint client application 105 can determine various information about the user device 103. For example, the endpoint client application 105 may be able to determine whether or not the user device 103 is set up to require a system password to be entered upon booting of the user device 103 or bringing the user device 103 out of a standby/hibernation or a screensaver mode. The system password may prevent unauthorized use of the user device 103 when the user device 103 is lost, stolen or borrowed, so the security policy for the SAAS server 102 may require use of the system password in order to reduce the likelihood of unauthorized use of the user device 103 to access the SAAS server 102. The endpoint client application 105 may, thus, include information in the compliance data that indicates whether the system password feature of the user device 103 is enabled. In this manner, if the compliance data indicates that the user device 103 is not set up to use the system password, then the compliance check result may indicate a failure to meet the security policy, and the authentication application 106 may deny access to the SAAS server 102 for the user device 103.

In some embodiments, the vendor responsible for the SAAS server 102 may require that some or all of the data maintained by the SAAS server 102 be encrypted when stored on a storage device, e.g., for privacy, business or regulatory reasons. In this case, the encryption state of the user device 103 is relevant to the SAAS vendor, because all users who download the data or access the services from the SAAS server 102 may also be required to maintain the data in an appropriate encryption state. In this manner, the data can be protected from theft or viewing by an unauthorized party even after it has been downloaded from the SAAS server 102 to the user device 103, because the data still cannot be accessed without a decryption key.

To ensure proper encryption of downloaded data, the endpoint client application 105 may determine whether the user device 103 includes and uses an appropriate encryption software. For this purpose, the endpoint client application 105 may be able to detect the presence of a variety of different security applications in a variety of different security categories. The endpoint client application 105 may detect whether such security products are both installed and enabled in the user device 103. The endpoint client application 105 may further detect whether such security products are properly configured to adequately protect the user device 103. Alternatively, the endpoint client application 105 may simply determine whether data stored on the user device 103 is encrypted. Additionally, the endpoint client application 105 may determine how well the user device 103 encrypts data (i.e. how easy the encryption is to break) based on the type of encryption, length of encryption key or the specific encryption software (or version thereof). Therefore, the compliance data transmitted by the endpoint client application 105 to the NAC server 101 may include information indicative of the presence/absence of encryption software on the user device 103, the specific encryption software used by the user device 103, whether an encryption product is installed in the user device 103 but not enabled, whether an encryption product is enabled only for some volumes but not for other volumes in the user device 103, the encryption state of data stored in the user device 103 and/or some other indicia indicative of encryption in the user device 103.

The encryption-related information may then be used by the NAC server 101 to generate at least part of the compliance check result. The NAC server 101, thus, compares the encryption-related information to the security policy for the SAAS server 102 and sets one or more indicia in the compliance check result related to encryption in the user device 103. In some embodiments, the lack of proper encryption may be a complete bar to granting access by the authentication application 106 to the data or services in the SAAS server 102 for the user device 103, so the compliance check result may include a simple pass/fail indicia for the encryption state of the user device 103. In other embodiments, the authentication application 106 may grant limited access to data or services on the SAAS server 102 for the user device 103 when the compliance check result indicates a lack of proper encryption on the user device 103. In still other embodiments, a more detailed compliance check result may indicate a level of encryption (e.g., a no/low/medium/high indicia) on the user device 103, and the authentication application 106 may set a level of access for the user device 103 that depends on the level of encryption. In other embodiments, access to some data or services in the SAAS server 102 may require one set of encryption indicia to indicate "pass," and access to other data or services in the SAAS server 102 may require a different set of encryption indicia to indicate "pass."

In some embodiments, the vendor responsible for the SAAS server 102 may require that the user devices 103 that access the SAAS server 102 have adequate protection against computer viruses and other malware. In this case, the endpoint client application 105 can generally detect the presence of a variety of different antivirus products on the user device 103, and the compliance data collected by the endpoint client application 105 may indicate the presence or absence of such products.

Additionally, the vendor may consider certain antivirus products to provide inadequate protection. In this case, the compliance data may indicate the specific antivirus products that are installed and activated in the user device 103.

Furthermore, the vendor may consider some antivirus products to be inadequate unless certain features of the antivirus products are enabled or set in a particular manner. In this case, the endpoint client application 105 may be further capable of querying the antivirus products to determine their settings. The compliance data may further indicate these settings.

Also, the vendor may consider user devices 103 that are attacked too often by malware to be too big of a risk to access the SAAS server 102. In this case, the endpoint client application 105 may be capable of querying the antivirus products to determine how often the user device 103 has experienced a malware attack or infection in any given period of time. The compliance data may further indicate this information.

Upon analyzing the malware-related compliance data with respect to the security policy for the SAAS server 102, the NAC server 101 may include in the compliance check result a simple pass/fail indicia indicative of whether the user device 103 has adequate malware protection. Alternatively, a more detailed compliance check result may include information for one or more of the different types of malware-related compliance data described above. The authentication application 106 may then deny access to the SAAS server 102 for user devices 103 that have a compliance check result that indicates a failure to comply with anti-malware criteria of the security policy. Alternatively, the authentication application 106 may grant limited access when the compliance check result indicates that the user device 103 passes some of the malware-related criteria of the security policy, but fails to meet other (potentially minor) criteria.

In some embodiments, the NAC server 101 may have several different antivirus products in operation. In this case, the endpoint client application 105 may forward suspect programs, portions of suspect programs or data generated from suspect programs (e.g., hash data) to the NAC server 101. The NAC server 101 can then analyze this information with the various antivirus products to determine whether the user device 103 has a malware infection and optionally the potential severity of the infection. The NAC server 101 may then inform the endpoint client application 105 that the user device 103 has a malware infection (and optionally the nature or severity of the infection) and/or may include this information in the compliance check result. The authentication application 106 may then grant or deny access (or limited access) to the SAAS server 102 for the user device 103.

In some embodiments, the vendor responsible for the SAAS server 102 may require that the user devices 103 that access the SAAS server 102 not have certain unwanted or undesirable applications or unusual, suspect, risky or vulnerable hardware components. These applications may not necessarily be malware, but simply applications whose normal operations may compromise the security of the data or services of the SAAS server 102 or the performance of the user device 103. Such applications may provide a "back door" for unregulated or uncontrolled access to data from the SAAS server 102 by unauthorized people. For example, a backup or sync application may be able to read data stored on the user device 103 and back it up or sync it to a network or cloud storage facility. If the data is encrypted, then the security risk may be minimal. However, if the user device 103 decrypts the data before the backup application obtains it, then decrypted data may be uploaded to potentially unsecure storage facilities. Additionally, some unwanted hardware components may not necessarily be a security problem. However, an unusual hardware component may simply be a component that is unidentifiable, so it is unknown whether there is an actual security problem with this component. Also, a hardware component may be suspect if it is identified as an ordinary, but unnecessary, component. For example, although keyboards are typically ordinary components commonly connected to the user devices 103, a second keyboard detected as being connected to the user device 103 may be suspect, because it is unnecessary and could actually be a type of malware called "Bad USB." Furthermore, a web camera, microphone, or other enabled I/O device in the user device 103 may be risky, since these devices may be used to acquire information about the user device 103. In addition, hardware components that are known to be vulnerable, or outdated hardware that could potentially have become vulnerable, may represent a security issue. Therefore, to be safe, it may be preferable in some embodiments to deny access to user devices 103 that have any detected unusual, suspect, risky or vulnerable hardware components.

The endpoint client application 105, may be capable of detecting the presence of such applications or hardware known to present a potential security risk or that are unidentifiable. The collected compliance data, therefore, may include an indication of the presence of such applications or hardware and/or the identity of these applications or hardware. The compliance check result may provide this information to the authentication application 106. Then the authentication application 106 may deny access to the SAAS server 102 for the user device 103 or may alert the user device 103 that the identified applications or hardware must be disabled, uninstalled or removed before access can be granted.

Each of the various types of information described herein (and any other potentially relevant data) may be collected into the compliance data by the endpoint client application 105 and sent to the NAC server 101 for analysis with regard to the security policy for the SAAS server 102. The NAC server 101 may then generate the compliance check result based on this compliance data, so the authentication application 106 is able to determine whether to grant or deny access to the SAAS server 102 by the user device 103.

Since the various types of information can potentially change at any time, the endpoint client application 105 may update the compliance data. The updated compliance data may then be used by the NAC server 101 to update the compliance check result. The updates may occur upon demand (e.g., by a user of the user device 103) or at regular time intervals (e.g., every few minutes, hours or days). Alternatively, similar to the manner in which antivirus programs scan newly installed software and data, the endpoint client application 105 may initiate a compliance data update upon detecting a change in the hardware, software or configuration of the user device 103. Furthermore, the authentication application 106 may be capable of detecting an expired compliance check result, e.g., if the compliance check result contains an expiration time stamp (or creation/modification date), and the security policy sets a maximum time between compliance data updates. In this case, if the compliance check result is too old, the authentication application 106 may deny access to the SAAS server 102 for the user device 103 until the compliance check result has been updated. Additionally, the update may be required to occur even if the compliance data has not changed in order to reset the time stamp and ensure that the compliance check result is current. In general, an expiration time stamp may be set to be slightly later than the next expected scan or compliance data collection time, so the endpoint client application 105 and the NAC server 101 have time to perform the update.

The endpoint client application 105 may be installed or deployed in the user device 103 in any appropriate manner.

For example, a user of the user device 103 may install and activate the endpoint client application 105 from an online download or storage device upload (e.g., from a CD, DVD, flash drive, etc.) or activate the endpoint client application as a browser plugin or as a portable executable that does not require any installation. Alternatively, an administrator of the SAAS server 102 (or of a customer of the SAAS server 102) may install the endpoint client application 105 before the user is allowed to use the user device 103. In some embodiments, the endpoint client application 105 may be automatically installed (optionally with user approval) in the user device 103 upon the first attempt by the user device 103 to access the SAAS server 102.

The authentication application 106 may obtain the compliance check result in any appropriate manner. For example, the NAC server 101 may send the compliance check result to the endpoint client application 105, which may insert the compliance check result (and the identity data of the user device 103) into a web browser cookie and inject the cookie into a local database(s) for any web browsers installed in the user device 103. Then when the authentication application 106 detects an attempt to access the SAAS server 102 by the web browser on the user device 103, the authentication application 106 may request the cookie from the web browser and thereby obtain the compliance check result. In another example, HTML5 could be used with local storage to enable the authentication application 106 to obtain the compliance check result.

Alternatively, in some embodiments, the NAC server 101 does not send the compliance check result to the endpoint client application 105. Instead, the NAC server 101 (or another network storage device) maintains the compliance check result, and the endpoint client application 105 stores the identity data for the user device 103 in the cookie. Then when the authentication application 106 detects an attempt to access the SAAS server 102 by the user device 103 (e.g., by the web browser on the user device 103), the authentication application 106 requests the cookie from the user device 103, or the web browser thereon, and thereby obtains the identity data for the user device 103.

Alternatively, in some embodiments, the endpoint client application 105 stores the identity data for the user device 103 in a client certificate on the user device 103. Then when the authentication application 106 detects an attempt to access the SAAS server 102 by the user device 103, the authentication application 106 requests the client certificate from the user device 103 and thereby obtains the identity data for the user device 103. The client certificate is a digital certificate that typically contains a variety of information, such as a serial number, an entity identified by the client certificate, a signature, an entity that issued the client certificate, etc. The client certificate is conventionally used by a client device to make authenticated requests to a remote server in mutual authentication designs for strong assurances of a requester's identity. In the present case, when the endpoint client application 105 is installed or run on the user device 103, the endpoint client application 105 installs the client certificate (signed) in a "personal certificate store" or "keychain" on the user device 103. In some embodiments, when the endpoint client application 105 is uninstalled or exited on the user device 103, the endpoint client application 105 removes the client certificate. The presence (or absence) of the client certificate, therefore, can be used to infer the presence (or absence) of the endpoint client application 105 on the user device 103, or vice versa, in some embodiments. The configuration needed to request and read the client certificate is different for different web servers. For example, when using Nginx (a type of web server), the web server is configured with an ssl_verify_client setting. The contents of the client certificate are then available to the web server as variables $ssl_client_cert or $ssl_client_s_dn.

With the identity data, the authentication application 106 requests the compliance check result from the NAC server 101 (or other network storage device). Alternatively, with the identity data, the authentication application 106 requests a simple pass/fail response from the NAC server 101, instead of a detailed compliance check result. In other alternatives, the authentication application 106 may use the identity data in the cookie or client certificate to request the original compliance data from the NAC server 101. Then the authentication application 106, instead of the NAC server 101, may perform the compliance check and produce the compliance check result.

In some embodiments, the compliance check result is optionally encrypted to reduce the likelihood of tampering with the data therein. Without encryption, such tampering could make it possible for the user device 103 to improperly gain access to the SAAS server 102 or for the authentication application 106 to improperly deny the access. In some embodiments in which the NAC server 101 sends the compliance check result to the endpoint client application 105 for insertion in the web browser cookie or client certificate, the NAC server 101 encrypts the compliance check result before sending it to the endpoint client application 105. In other embodiments in which the NAC server 101 sends the compliance check result to the endpoint client application 105 for insertion in the web browser cookie or client certificate, the NAC server 101 sends an encryption key along with the compliance check result, so the endpoint client application 105 can encrypt the compliance check result before inserting it into the cookie or client certificate. (The encryption key may be specific for the SAAS server 102, so each user device 103 may receive the same encryption key for the same SAAS server 102.) In some embodiments in which the NAC server 101 does not send the compliance check result to the endpoint client application 105, the NAC server 101 encrypts the compliance check result before sending it to the authentication application 106. In some embodiments in which the NAC server 101 sends the compliance data (instead of the compliance check result) to the authentication application 106 for performing the compliance check by the authentication application 106, the NAC server 101 may encrypt the compliance data before sending it or provide the authentication application 106 with the encryption key with which to encrypt the compliance data. In each case, the authentication application 106 obtains a decryption key (specific for the SAAS server 102 and paired with the encryption key) from the NAC server 101 in order to decrypt the compliance check result. In other embodiments, however, the authentication application 106 may receive the encrypted compliance check result in the cookie or client certificate from the user device 103, but may send it to the NAC server 101 for decryption and receive back a simple pass/fail response from the NAC server 101. In this embodiment, the unencrypted compliance check results do not leave the NAC server 101, so this embodiment may provide better security than those embodiments that do allow unencrypted compliance check results to leave the NAC server 101.

In some embodiments, the authentication application 106 may determine that the compliance check result cannot be trusted or is insufficient to be the sole basis on which the authentication application 106 grants or denies access to the SAAS server 102 for the user device 103. For example, the compliance check result may provide only summary information or a simple uninformative pass/fail indicia for some components of the compliance data, or some portion of the compliance check result may have an incorrect format (an indication of possible tampering), or there may be some reason for suspecting that at least part of the compliance check result is in error. In this case, the authentication application 106 may request the most recent complete compliance data (or a portion thereof) from the NAC server 101 in order to make its own comparison with the requirements of the security policy. The access grant/deny decision can then be made based on the results of this comparison.

An example process 200 for collecting the compliance data and generating the compliance check result is shown in FIG. 2 in accordance with some embodiments. The process 200 is generally performed by, or performed under the control of, the endpoint client application 105, the NAC server 101, and a web browser 201 on the user device 103. In other embodiments, one or more processes for collecting the compliance data and generating the compliance check result may use other appropriate steps or combinations or orderings of steps.

After the endpoint client application 103 has been installed and launched on the user device 103, the endpoint client application 103 performs a security compliance check to collect (at 202) all of the various components of the compliance data, as described above. At 203, the endpoint client application 103 sends the compliance data, along with the identity data for the user device 103 (and if necessary, an identity data for the SAAS server 102 that the user device 103 will access), through the network 104 to the NAC server 101.

At 204, the NAC server 101 receives the compliance data and the identity data for the user device 103. (Alternatively, the NAC server 101 receives the compliance data and then generates the identity data for the user device 103.) At 205, the NAC server 101 compares the received compliance data with the security policy for the SAAS server 102 and generates the compliance check result with whatever details are specified, e.g., by the vendor for the SAAS server 102 or the vendor's customer. In the illustrated embodiment, the NAC server 101 sends (at 206) the compliance check result and the encryption key for the specified SAAS server 102 through the network 104 to the endpoint client application 105. (Alternatively, the NAC server 101 encrypts the compliance check result and sends the encrypted compliance check result to the endpoint client application 105.)

In the illustrated embodiment, the endpoint client application 105 receives (at 207) the compliance check result (and the encryption key if the compliance check result is not already encrypted). At 208, the endpoint client application 105 generates a cookie (for each web browser installed in the user device 103 or for a specified web browser) containing the received compliance check result, the identity data for the user device 103, and a time stamp or expiration time. Alternatively, for embodiments using a client certificate, the endpoint client application 105 generates the client certificate (at 208) containing the received compliance check result, the identity data for the user device 103, and a time stamp or expiration time. Also, the endpoint client application 105 encrypts the data in the cookie or client certificate using the received encryption key if the compliance check result is not already encrypted in this embodiment. At 209, the endpoint client application 105 injects the cookie onto each web browser (or the specified web browser(s)) where the cookie is stored (at 210) in a local database(s) or a storage location(s) used by the web browser(s). The endpoint client application 105 may use a low level driver to inject and manage the cookie. Alternatively, for embodiments using a client certificate, the endpoint client application 105 stores the client certificate (at 209) in the memory or data storage of the user device 103 (e.g., in the system certificates management for Windows-based user devices, the OSX keychain service for Apple OSX-based user devices, or other appropriate data storage location depending on the operating system of the user device). The user device 103 is then ready to be used to access the SAAS server 102.

An example process 300 for authenticating the user device 103 for access to the SAAS server 102 is shown in FIG. 2 in accordance with some embodiments. The process 300 is generally performed by, or performed under the control of, the NAC server 101, the authentication application 106 on the SAAS server 102, and the web browser 201 on the user device 103. In other embodiments, one or more processes for collecting the compliance data and generating the compliance check result may use other appropriate steps or combinations or orderings of steps.

To begin, the user of the user device 103 attempts to login to the SAAS server 102 using the web browser 201, so the web browser 201 sends (at 301) through the network 104 a request to access the SAAS server 102. An initial login procedure between the user device 103 and the SAAS server 102 is performed (at 302), e.g., with an exchange of a username and password. If the username and password are correct, then the authentication application 106 requests (at 303) the special cookie or client certificate from user device 103, or the web browser 201, which sends (at 304) the cookie or client certificate (e.g., from the local database, the system certificates management, the keychain service, or other appropriate data storage location) to the authentication application 106.

In this embodiment, if the authentication application 106 has not already obtained the decryption key from the NAC server 101, then the authentication application 106 sends (at 305) to the NAC server 101 a request for the decryption key. The NAC server 101, which maintains the encryption/decryption key pairs in a database, sends (at 306) the decryption key to the authentication application 106.

In this embodiment, the authentication application 106 decrypts (at 307) the cookie or client certificate contents to obtain the compliance check result and the identity data for the user device 103. The authentication application 106 may also check the time stamp or expiration time and deny access if the cookie or client certificate has expired. At 308, the authentication application 106 determines whether the compliance check result can be trusted, as described above.

If there is no reason to suspect that the compliance check result is in error or has been tampered with, as determined at 308, then the authentication application 106 determines (at 309) whether to grant or deny access to the SAAS server 102 for the user device 103 based on the contents of the compliance check result. If access is granted, then the user of the user device 103 may begin accessing the data and/or services of the SAAS server 102 through the web browser 201. If access is denied, on the other hand, then any appropriate response may be made, e.g., sending an error message to the web browser 201, alerting an administrator of a failed access attempt, logging the failed access attempt, flagging the user device 103 as having a history of being rejected, etc.

If there is reason to suspect that the compliance check result is in error or has been tampered with, as determined at 308, then the authentication application 106 may send (at 310) the identity data for the user device 103 to the NAC server 101 and request the original most recent compliance data (or a portion thereof) maintained for the user device 103. When the NAC server 101 receives the request and the identity data, it sends (at 311) the requested compliance data (or portion thereof) to the authentication application 106. Then the authentication application 106 determines (at 312) whether to grant or deny access to the SAAS server 102 for the user device 103 based on the contents of the compliance data (and optionally on any trusted portions of the compliance check result). If access is granted, then the user of the user device 103 may begin accessing the data and/or services of the SAAS server 102 through the web browser 201. If access is denied, on the other hand, then any appropriate response may be made, e.g., sending an error message to the web browser 201, alerting an administrator of a failed access attempt, logging the failed access attempt, flagging the user device 103 as having a history of being rejected, etc.

An alternative example network computerized system 400 incorporating an embodiment of the present invention is shown in FIG. 4. The network computerized system 400 generally includes one or more of the NAC server 101, one or more of the SAAS server 102, one or more of the user device 103, and one or more of an authentication and SSO (Single Sign On) server 401. The NAC server 101, the SAAS server 102, the user device 103, and the authentication and SSO server 401 generally communicate with each other via the network 104. The NAC server 101, the SAAS server 102, the user device 103, and the network 104 may be similar to the above description, but with any following distinguishing features. For example, the authentication and SSO server 401 performs some of the previously described functions of the authentication application 106. In other words, the authentication application 106 is between the SAAS server 102 and the user device 103 and intercepts any attempt to login transparent to the user device 103.

In this embodiment, the authentication and SSO server 401 generally performs the functions of retrieving the cookie or client certificate and making the access grant/deny decision, as described above for the authentication application 106. If access is granted for the user device 103, then the authentication and SSO server 401 authenticates a secure session ID to the web browser (on the user device 103) for the web browser and the SAAS server 102 to interact. The SAAS server 102, on the other hand, primarily performs only the function of hosting the sensitive data and services. The authentication application 106 is generally reduced to accepting the secure session for the SAAS server 102, i.e., simply granting access by the user device 103 based on the secure session ID. The web browser then uses the authenticated session to access data and/or services on the SAAS server 102.

In this embodiment, the authentication and SSO server 401 also obtains the decryption key (if used) from the NAC server 101. Thus, the authentication and SSO server 401 further decrypts the contents of the cookie or client certificate received from the user device 103 and/or any encrypted data (e.g., compliance check result or compliance data) received from the NAC server 101.

A benefit of this alternative solution is that little or no changes are required for the SAAS server 102 from a conventional SAAS server. Therefore, almost any customer (of the NAC server 101 and/or of the SAAS server 102) could build a variation of the authentication and SSO server 401 and integrate it into the rest of the network computerized system 400 to isolate the authentication functions from the SAAS functions.

A simplified schematic diagram showing an example structure for the NAC server 101 is shown in FIG. 5 in accordance with an embodiment of the present invention. Other embodiments may use other components and combinations of components. For example, the NAC server 101 may represent one or more physical computer devices, such as web servers, network storage devices, etc. In some embodiments implemented at least partially in a cloud network potentially with data synchronized across multiple geolocations, the NAC server 101 may be referred to as a cloud server.

In the illustrated embodiment, the NAC server 101 generally includes at least one processor 500, a main memory 501, a data storage 502, a user I/O 503, and a network I/O 504, among other components not shown for simplicity, connected or coupled together by a data communication subsystem 505. The data storage 502 generally maintains the compliance security policy 506, the compliance data 507, the encryption/decryption keys 508, a compliance check application 509, and the compliance check results 510.

The processor 500 represents one or more central processing units on one or more PCBs in one or more housings or enclosures. The main memory 501 represents one or more RAM modules on one or more PCBs in one or more housings or enclosures. The data storage 502 represents any appropriate number or combination of internal or external physical mass storage devices, such as hard drives, optical drives, network-attached storage (NAS) devices, flash drives, etc. The user I/O 503 represents one or more appropriate user interface devices, such as keyboards, pointing devices, displays, etc. The network I/O 504 represents any appropriate networking devices, such as network adapters, etc. for communicating through the network 104. The data communication subsystem 505 represents any appropriate communication hardware for connecting the other components in a single unit or in a distributed manner on one or more PCBs, within one or more housings or enclosures, within one or more rack assemblies, etc.

Under control of the compliance check application 509, the processor 500 interacts with the endpoint client application 105 through the network I/O 504, as described above, to generate the compliance check results 510 based on the compliance security policy 506 and the compliance data 507. The processor 500 then causes the compliance check results 510 to be sent through the network I/O 504 along with the encryption key (508) to the endpoint client application 105. When the SAAS server 102 requests any data (e.g., the decryption key (508), the compliance check result 510 or the compliance data 507) from the NAC server 101, as described above, the processor 500 causes the data to be sent to the SAAS server 102 through the network I/O 504.

A simplified schematic diagram showing an example structure for the SAAS server 102 is shown in FIG. 6 in accordance with an embodiment of the present invention. Other embodiments may use other components and combinations of components. For example, the SAAS server 102 may represent one or more physical computer devices, such as web servers, network storage devices, cloud-based devices, etc.

In the illustrated embodiment, the SAAS server 102 generally includes at least one processor 600, a main memory 601, a data storage 602, a user I/O 603, and a network I/O 604, among other components not shown for simplicity, connected or coupled together by a data communication subsystem 605. The data storage 602 generally maintains the decryption key 606, SAAS applications and data 607, and the authentication application 106. The SAAS applications and data 607 generally represent the services and data used by the user devices 103 after being granted access to the SAAS server 102.

The processor 600 represents one or more central processing units on one or more PCBs in one or more housings or enclosures. The main memory 601 represents one or more RAM modules on one or more PCBs in one or more housings or enclosures. The data storage 602 represents any appropriate number or combination of internal or external physical mass storage devices, such as hard drives, optical drives, network-attached storage (NAS) devices, flash drives, etc. The user I/O 603 represents one or more appropriate user interface devices, such as keyboards, pointing devices, displays, etc. The network I/O 604 represents any appropriate networking devices, such as network adapters, etc. for communicating through the network 104. The data communication subsystem 605 represents any appropriate communication hardware for connecting the other components in a single unit or in a distributed manner on one or more PCBs, within one or more housings or enclosures, within one or more rack assemblies, etc.

Under control of the authentication application 106, the processor 600 interacts with web browser of the user device 103 and the NAC server 101 through the network I/O 604, as described above, to determine whether to grant or deny access to the SAAS server 102 for the user device 103. If the user device 103 is granted access, then under control of the SAAS applications and data 607, the processor further interacts with the web browser of the user device 103 through the network I/O 604 to provide the services and data that the user of the user device 103 wants to access.

A simplified schematic diagram showing an example structure for the user device 103 is shown in FIG. 7 in accordance with an embodiment of the present invention. Other embodiments may use other components and combinations of components. The user device 103 may be a desktop computer, a workstation, a notebook computer, a tablet computer, a hand held computer, a cell phone, a smart phone, a game console or any other appropriate computerized device that a person/user may use to access the SAAS server 102 through the network 104.

In the illustrated embodiment, the user device 103 generally includes at least one processor 700, a main memory 701, a data storage 702, a user I/O 703, and a network I/O 704, among other components not shown for simplicity, connected or coupled together by a data communication subsystem 705. The data storage 702 generally maintains the endpoint client application 105, the compliance data 706, an encryption application 707, the web browser(s) 708, the cookie local database(s) 709 or the client certificate 713 (e.g., in the system certificates management, the keychain service, or other appropriate data storage location), security and antivirus applications 710, the encryption key 711, and other applications 712.

The processor 700 represents one or more central processing units on one or more PCBs in one or more housings or enclosures. The main memory 701 represents one or more RAM modules on one or more PCBs in one or more housings or enclosures. The data storage 702 represents any appropriate number or combination of internal or external physical mass storage devices, such as hard drives, optical drives, network-attached storage (NAS) devices, flash drives, etc. The user I/O 703 represents one or more appropriate user interface devices, such as keyboards, pointing devices, displays, etc. The network I/O 704 represents any appropriate networking devices, such as network adapters, etc. for communicating through the network 104. The data communication subsystem 705 represents any appropriate communication hardware for connecting the other components in a single unit or in a distributed manner on one or more PCBs, within one or more housings or enclosures, within one or more rack assemblies, etc.

Under control of the endpoint client application 105, the processor 700 interacts with the encryption application 707, the security and antivirus applications 710, and the other applications 712 to collect the compliance data 706. Then the processor 700 interacts with the NAC server 101 through the network I/O 704, as described above, to generate the compliance check results based on the compliance security policy and the compliance data 706 and to create the cookie or client certificate (encrypted with the encryption key 711) and inject it into the cookie or client certificate local database(s) 709. Then under control of the web browser 708, the processor 700 interacts with the authentication application 106 to attempt to gain access to the SAAS server 102 through the network I/O 704 and the network 104. If the user device 103 is granted access, then under control of the web browser 708, the processor 700 interacts with the SAAS applications and data 607 of the SAAS server 102 through the network I/O 704 and the network 104 to use the services and data that the user wants.

Although embodiments of the invention have been discussed primarily with respect to specific embodiments thereof, other variations are possible. Various configurations of the described structures or processes may be used in place of, or in addition to, the configurations presented herein.

Those skilled in the art will appreciate that the foregoing description is by way of example only, and is not intended to limit the invention. Nothing in the disclosure should indicate that the invention is limited to systems that are implemented on a single computerized system. In general, any diagrams presented are only intended to indicate one possible configuration, and many variations are possible. Those skilled in the art will also appreciate that methods and systems consistent with the present invention are suitable for use in a wide range of applications encompassing NAC systems.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A method comprising:
    receiving, by an authentication application from a user device, a request to access a software-as-a-service server;
    retrieving, by the authentication application from the user device, a compliance check result generated by a network access control server based on 1) compliance data collected by a client application on the user device, and 2) a security policy for the software-as-a-service server, wherein the compliance check result indicates whether the user device is compliant with the security policy for the software-as-a-service server;
    granting, by the authentication application, access by the user device to the software-as-a service server when the compliance check result is positive; and denying, by the authentication application, access by the user device to the software-as-a service server when the compliance check result is negative;

wherein the compliance data includes an encryption state of the user device, a potential for a malware infection of the user device, whether a potentially unwanted application is present on the user device, whether a potentially unwanted hardware component is present on the user device, how often the user device has experienced a malware infection in a period of time, whether the user device is set up to require a password to be entered upon booting of the user device, antivirus products that are installed and activated in the user device, settings of the antivirus products, a running state of applications on the user device, and anti-malware definition state information.

2. The method of claim 1, wherein the retrieving further comprises:
requesting, by the authentication application, a cookie of a web browser from the user device during a login procedure, the cookie containing the compliance check result; and
reading, by the authentication application, the compliance check result from the cookie.

3. The method of claim 1, wherein the retrieving further comprises:
requesting, by the authentication application, a client certificate from the user device during a login procedure, the client certificate containing the compliance check result; and
reading, by the authentication application, the compliance check result from the client certificate.

4. The method of claim 1, further comprising:
requesting, by the authentication application, the compliance data from the network access control server; and
granting or denying, by the authentication application, access by the user device based on the compliance check result and the compliance data.

5. The method of claim 1, further comprising:
receiving, by the authentication application from the network access control server, a decryption key; and
decrypting, by the authentication application using the decryption key, the compliance check result.

6. The method of claim 1, further comprising:
generating, by an authentication server, a secure session ID when the compliance check result is positive; and
granting, by the authentication application, access by the user device based on the secure session ID.

7. A method comprising:
receiving, by an authentication application from a user device, a request to access a software-as-a-service server;
retrieving, by the authentication application, a compliance check result generated by a network access control server based on 1) compliance data collected by a client application on the user device, and 2) a security policy for the software-as-a-service server;
granting, by the authentication application, access by the user device to the software-as-a-service server when the compliance check result is positive; and
denying, by the authentication application, access by the user device to the software-as-a-service server when the compliance check result is negative;
wherein the compliance data includes an encryption state of the user device, a potential for a malware infection of the user device, whether a potentially unwanted application is present on the user device, whether a potentially unwanted hardware component is present on the user device, how often the user device has experienced a malware infection in a period of time, whether the user device is set up to require a password to be entered upon booting of the user device, antivirus products that are installed and activated in the user device, settings of the antivirus products, a running state of applications on the user device, and anti-malware definition state information.

8. A method comprising:
collecting, by a client application on a user device, compliance data on the user device; and
sending, by the client application, the compliance data to a network access control server for the network access control server to generate a compliance check result based on the compliance data and a security policy for a software-as-a-service server, wherein the compliance check result is for use by an authentication application to grant access by the user device to the software-as-a-service server when the compliance check result is positive and to deny access by the user device to the software-as-a-service server when the compliance check result is negative,
and wherein the compliance check result indicates whether the user device is compliant with the security policy for the software-as-a-service server;
receiving, by the client application, the compliance check result from the network access control server; and
storing, by the client application, the compliance check result for the user device to send the compliance check result to the authentication application upon receiving a request for the compliance check result from the authentication application during a login procedure;
wherein the compliance data includes an encryption state of the user device, a potential for a malware infection of the user device, whether a potentially unwanted application is present on the user device, whether a potentially unwanted hardware component is present on the user device, how often the user device has experienced a malware infection in a period of time, whether the user device is set up to require a password to be entered upon booting of the user device, antivirus products that are installed and activated in the user device, settings of the antivirus products, a running state of applications on the user device, and anti-malware definition state information.

9. The method of claim 8, wherein:
the storing of the compliance check result further comprises storing, by the client application, the compliance check result in a cookie of a web browser installed on the user device for the user device to send the compliance check result in the cookie to the authentication application upon receiving a request for the cookie from the authentication application during the login procedure.

10. The method of claim 9, further comprising:
encrypting, by the client application, the compliance check result using an encryption key; and
storing, by the client application, the encrypted compliance check result in the cookie further for the authentication application to decrypt the encrypted compliance check result using a decryption key that the authentication application receives from the network access control server.

11. The method of claim 8, further comprising:
the storing of the compliance check result further comprises storing, by the client application, the compliance check result in a client certificate on the user device, for the user device to send the compliance check result in the client certificate to the authentication application upon receiving a request for the client certificate from the authentication application during the login procedure.

12. A method comprising:
collecting, by a client application on a user device, compliance data on the user device; and
sending, by the client application, the compliance data to a network access control server for the network access control server to generate a compliance check result based on the compliance data and a security policy for a software-as-a-service server, wherein the compliance check result is for use by an authentication application to grant access by the user device to the software-as-a-service server when the compliance check result is positive and to deny access by the user device to the software-as-a-service server when the compliance check result is negative;
wherein the compliance data includes an encryption state of the user device, a potential for a malware infection of the user device, whether a potentially unwanted application is present on the user device, whether a potentially unwanted hardware component is present on the user device, how often the user device has experienced a malware infection in a period of time, whether the user device is set up to require a password to be entered upon booting of the user device, antivirus products that are installed and activated in the user device, settings of the antivirus products, a running state of applications on the user device, and anti-malware definition state information.

13. A method comprising:
collecting, by a client application, compliance data on a user device;
sending, by the client application, the compliance data to a network access control server;
generating, by the network access control server, a compliance check result based on the compliance data and a security policy for a software-as-a-service server, wherein the compliance check result indicates whether the user device is compliant with the security policy for the software-as-a-service server;
sending, by the network access control server to the user device, the compliance check result;
storing, by the client application, the compliance check result on the user device;
receiving, by an authentication application from a user device, a request to access the software-as-a-service server;
retrieving, by the authentication application from the user device, the compliance check result during a login procedure;
granting, by the authentication application, access by the user device to the software-as-a service server when the compliance check result is positive; and
denying, by the authentication application, access by the user device to the software-as-a service server when the compliance check result is negative;
wherein the compliance data includes an encryption state of the user device, a potential for a malware infection of the user device, whether a potentially unwanted application is present on the user device, whether a potentially unwanted hardware component is present on the user device, how often the user device has experienced a malware infection in a period of time, whether the user device is set up to require a password to be entered upon booting of the user device, antivirus products that are installed and activated in the user device, settings of the antivirus products, a running state of applications on the user device, and anti-malware definition state information.

14. The method of claim 13, further comprising:
encrypting the compliance check result using an encryption key;
receiving, by the authentication application from the network access control server, a decryption key; and
decrypting, by the authentication application using the decryption key, the compliance check result.

15. The method of claim 13, further comprising:
requesting, by the authentication application, the compliance data from the network access control server; and
granting or denying, by the authentication application, access by the user device based on the compliance check result and the compliance data.

16. The method of claim 13, further comprising:
generating, by an authentication server, a secure session ID when the compliance check result is positive; and
granting, by the authentication application, access by the user device based on the secure session ID.

17. A method comprising:
collecting, by a client application, compliance data on a user device;
sending, by the client application, the compliance data to a network access control server;
generating, by the network access control server, a compliance check result based on the compliance data and a security policy for a software-as-a-service server;
storing, by the network access control server, the compliance check result;
storing, by the client application, a user device identifier in a client certificate on the user device;
requesting, by an authentication application, the client certificate during a login procedure;
reading, by the authentication application, the user device identifier from the client certificate;
based on the user device identifier, requesting, by the authentication application, the compliance check result from the network access control server;
granting, by the authentication application, access by the user device to the software-as-a-service server when the compliance check result is positive; and
denying, by the authentication application, access by the user device to the software-as-a-service server when the compliance check result is negative;
wherein the compliance data includes an encryption state of the user device, a potential for a malware infection of the user device, whether a potentially unwanted application is present on the user device, whether a potentially unwanted hardware component is present on the user device, how often the user device has experienced a malware infection in a period of time, whether the user device is set up to require a password to be entered upon booting of the user device, antivirus products that are installed and activated in the user device, settings of the antivirus products, a running state of applications on the user device, and anti-malware definition state information.

* * * * *